US008873633B2

(12) United States Patent
Lee et al.

(10) Patent No.: US 8,873,633 B2
(45) Date of Patent: Oct. 28, 2014

(54) METHOD AND APPARATUS FOR VIDEO ENCODING AND DECODING

(75) Inventors: Kyo-Hyuk Lee, Yongin-si (KR); Woo-jin Han, Suwon-si (KR); Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1237 days.

(21) Appl. No.: 12/031,847

(22) Filed: Feb. 15, 2008

(65) Prior Publication Data

US 2008/0240248 A1 Oct. 2, 2008

(30) Foreign Application Priority Data

Mar. 28, 2007 (KR) ........................ 10-2007-0030377

(51) Int. Cl.
*H04N 7/26* (2006.01)
*H04N 19/51* (2014.01)
*H04N 19/61* (2014.01)
*H04N 19/176* (2014.01)
*H04N 19/189* (2014.01)
*H04N 19/102* (2014.01)
*H04N 19/103* (2014.01)

(52) U.S. Cl.
CPC ............. *H04N 7/26872* (2013.01); *H04N 7/50* (2013.01); *H04N 7/26244* (2013.01); *H04N 7/26313* (2013.01); *H04N 7/26111* (2013.01); *H04N 7/26037* (2013.01)
USPC ...................................... 375/240.16; 382/232

(58) Field of Classification Search
USPC .................. 375/240, 240.03, 240.16, 240.24, 375/240.23, 240.27; 382/236, 240, 232, 382/166, 238
See application file for complete search history.

(56) References Cited

U.S. PATENT DOCUMENTS

| 6,192,148 | B1 * | 2/2001 | Lin ............................. 382/166 |
| 6,724,816 | B1 * | 4/2004 | Kim et al. ................. 375/240.03 |
| 6,859,500 | B2 * | 2/2005 | Frojdh et al. ............. 375/240.27 |
| 6,956,898 | B1   | 10/2005 | Podilchuk et al. |
| 7,379,607 | B2 * | 5/2008 | Srinivasan et al. ............ 382/238 |

(Continued)

FOREIGN PATENT DOCUMENTS

| JP | 2004-032355 A | 1/2004 |
| WO | 03053066 A1 | 6/2003 |
| WO | 03079681 A1 | 9/2003 |
| WO | 2005027497 A2 | 3/2005 |

OTHER PUBLICATIONS

Zhao et al, Macroblock skip mode prediction for complexit control of video encoder, 2003.*

(Continued)

*Primary Examiner* — Redentor Pasia
*Assistant Examiner* — Vincelas Louis
(74) *Attorney, Agent, or Firm* — Sughrue Mion, PLLC

(57) ABSTRACT

A method and apparatus for encoding a skip macroblock by dividing the skip macroblock into smaller skip sub blocks and using predictive motion vectors predicted from motion vectors of blocks adjacent to the skip sub blocks, and a method and apparatus for decoding the skip macroblock is provided. Accordingly, by adding predetermined binary information indicating whether the skip macroblock is divided to the skip macroblock that generally transmits only prediction mode information, division of the skip macroblock can be adaptively applied, or all skip macroblocks can be divided into sub-blocks to be processed, so that pixel values in the skip macroblock can be predicted by using motion vectors of spatially adjacent blocks. Therefore, prediction efficiency increases.

20 Claims, 10 Drawing Sheets

(56) References Cited

U.S. PATENT DOCUMENTS

| | | | |
|---|---|---|---|
| 8,107,536 B2* | 1/2012 | Morimoto et al. | 375/240.24 |
| 2002/0136306 A1* | 9/2002 | Frojdh et al. | 375/240.23 |
| 2004/0156437 A1 | 8/2004 | Lainema | |
| 2004/0184666 A1* | 9/2004 | Sekiguchi et al. | 382/236 |
| 2004/0252760 A1 | 12/2004 | Winger | |
| 2005/0063466 A1* | 3/2005 | Etoh et al. | 375/240.16 |
| 2006/0002474 A1* | 1/2006 | Au et al. | 375/240.16 |
| 2006/0083311 A1 | 4/2006 | Winger | |
| 2006/0262979 A1* | 11/2006 | Srinivasan et al. | 382/232 |
| 2007/0071105 A1* | 3/2007 | Tian et al. | 375/240.24 |
| 2008/0253457 A1* | 10/2008 | Moore | 375/240.16 |
| 2009/0196517 A1* | 8/2009 | Divorra Escoda et al. | 382/240 |
| 2010/0040148 A1* | 2/2010 | Marpe et al. | 375/240.16 |

OTHER PUBLICATIONS

Communication dated May 27, 2013 issued by the Korean Intellectual Property Office in counterpart Korean Patent Application No. 10-2007-0030377.

* cited by examiner

METHOD AND APPARATUS FOR VIDEO ENCODING AND DECODING

CROSS-REFERENCE TO RELATED PATENT APPLICATION

This application claims priority from Korean Patent Application No. 10-2007-0030377, filed on Mar. 28, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a new prediction mode of a macroblock, and more particularly, to encoding a skip macroblock capable of dividing a skip macroblock in a P (Predictive-coded)-frame into smaller skip sub-blocks and using predictive motion vectors predicted from motion vectors of blocks adjacent to the skip sub-blocks, and a video decoding method and apparatus for decoding the skip macroblock.

2. Description of the Related Art

Inter-frame and intra-frame predictions are two main video encoding techniques. Intra-frame prediction is a video encoding technique based on correlations of adjacent pixels in a single frame. Inter-frame prediction is a video encoding technique based on similarities between continuous frames in a video sequence.

In general, a motion vector of a block has a correlation with a motion vector of an adjacent block. Therefore, a motion vector of a current block can be predicted from an adjacent block, and only a differential motion vector between the motion vector of the current block and a predictive motion vector is encoded, so that bit-rates generated in decoding can be reduced.

FIG. 1 is a view for explaining a related art method of generating predictive motion vectors of a current macroblock.

Referring to FIG. 1, motion vector information on a current macroblock E is encoded as a differential motion vector which is a difference value between a predictive motion vector having a median value of motion vectors $MV_A$, $MV_B$, and $MV_C$ of left, upper, and upper right blocks A, B, and C with respect to the current macroblock E and a motion vector of the current macroblock E and is transmitted.

FIG. 2 is a view for explaining a prediction mode of a macroblock in a P-frame in H.264/Advanced Video Coding (AVC)

In encoding according to H.264, a macroblock in an I (Intra-coded)-frame is predictive-encoded according to a prediction mode selected according to a rate-distortion optimization from among intra 16×16 or intra 4×4 modes. The macroblock in the P-frame is encoded according to a prediction mode selected from among 16×16, 16×8, 8×16, 8×8, 8×4, 4×8, and 4×4 as illustrated in FIG. 2 according to the rate-distortion optimization or is encoded as a skip mode.

The skip mode is selected when a motion vector of a macroblock is the same as a predictive motion vector predicted using motion vectors of adjacent blocks or when a prediction error of a pixel is small enough. When the skip mode is selected as the prediction mode of the macroblock, an encoder transmits only skip mode information on the macroblock and does not transmit residual data. A decoder can restore the macroblock decoded as the skip mode by performing motion compensation by using the predictive motion vectors predicted from adjacent blocks.

However, according to the related art, the skip mode can be applied only to a macroblock having a size of 16×16. Therefore, all pixel values in the macroblock have to be motion-compensated by using only a single predictive motion vector, so that prediction efficiency may decrease.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a video encoding method and apparatus for encoding a skip macroblock by applying a new prediction mode which can represent motion vector information on the skip macroblock, and a video decoding method and apparatus for decoding the skip macroblock.

According to an aspect of the present invention, there is provided a video encoding method including: dividing a skip macroblock into skip sub-blocks; generating predictive motion vectors of each of the skip sub-blocks by using motion vectors of blocks adjacent to the skip sub-block; and encoding the skip macroblock including the skip sub-blocks by using the predictive motion vectors of each of the skip sub-blocks.

According to another aspect of the present invention, there is provided a video encoding apparatus including: a motion vector prediction unit dividing a skip macroblock into skip sub-blocks and generating predictive motion vectors of each of the skip sub-blocks by using motion vectors of blocks adjacent to each of the skip sub-blocks; and an encoder encoding the skip macroblock by using the predictive motion vectors of each of the skip sub-block.

According to another aspect of the present invention, there is provided a video decoding method including: determining a prediction mode of a decoded current macroblock that is included in a received bitstream; when the determination result shows that the current macroblock is a skip macroblock divided into skip sub-blocks and encoded by using predictive motion vectors of the divided skip sub-blocks as motion vector information, dividing the current macroblock into the skip sub-blocks; generating the predictive motion vectors of the skip sub-blocks by using motion vectors of blocks adjacent to each of the skip sub-blocks; and restoring the current macroblock by restoring data of the skip sub-blocks included in the current macroblock though motion compensation using the predictive motion vectors of each of the skip sub-blocks.

According to another aspect of the present invention, there is provided a video decoding apparatus including: a prediction mode determiner determining a prediction mode of a current macroblock that is included in a received bitstream and decoded; a motion vector prediction unit, when the determination result shows that the current macroblock is a skip macroblock divided into skip sub-blocks and encoded by using predictive motion vectors of the divided skip sub-blocks as motion vector information, dividing the current macroblock into the skip sub-blocks and generating the predictive motion vectors of each of the skip sub-blocks by using motion vectors of blocks adjacent to each of the skip sub-blocks; and a motion compensation unit restoring the current macroblock by restoring data of the skip sub-blocks included in the current macroblock through motion compensation using the predictive motion vectors of the skip sub-blocks.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the attached drawings.

Figure 3:
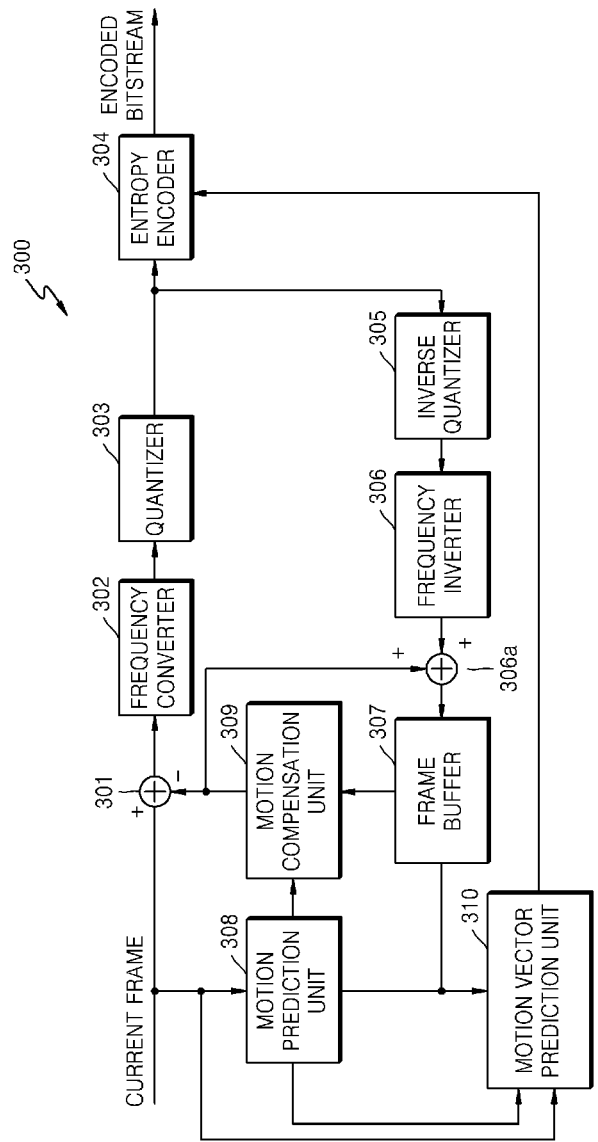
FIG. 3 is a block diagram illustrating a structure of a video encoding apparatus according to an exemplary embodiment of the present invention.

FIG. 3 is a block diagram illustrating a structure of a video encoding apparatus 300 according to an exemplary embodiment of the present invention.

The video encoding apparatus 300 according to the current exemplary embodiment of the present invention transmits a predetermined flag for a skip macroblock which is predictive-coded as a skip mode from among macroblocks in a P-frame or a B (Bidirectionally predictive-coded)-frame, and a predetermined skip macroblock division flag which indicates whether predictive motion vectors are to be generated in units of skip sub-blocks obtained by dividing a skip macroblock, so as to enable a decoding apparatus to determine whether the skip macroblock is divided and effectively predict the skip macroblock. Additionally, in order to determine whether the skip macroblock is divided for each macroblock, a 1-bit flag including division information may be allocated to each macroblock. Further, when the video encoding apparatus 300 and the decoding apparatus are set to perform dividing on all skip macroblocks in advance, a flag representing the division information may not be included in a bitstream.

Referring to FIG. 3, the video encoding apparatus 300 according to the current exemplary embodiment of the present invention includes a subtractor 301, a frequency converter 302, a quantizer 303, an entropy encoder 304, an inverse quantizer 305, a frequency inverter 306, an adder 306a, a frame buffer 307, a motion prediction unit 308, a motion compensation unit 309, and a motion vector prediction unit 310.

Figure 1:
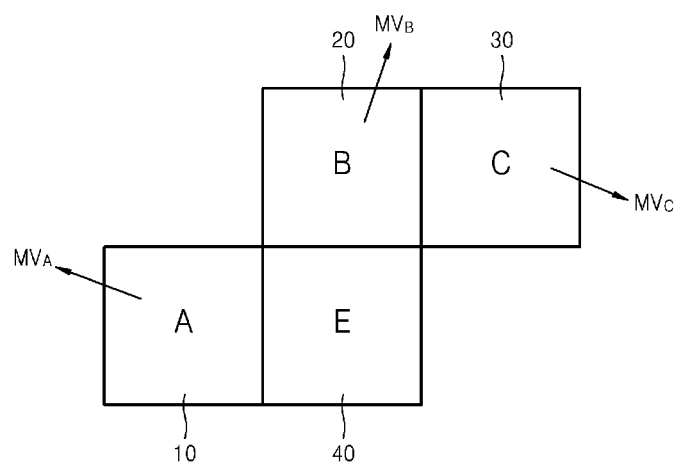
FIG. 1 is a view for explaining a related art method of generating predictive motion vectors of a current macroblock.
Figure 2:
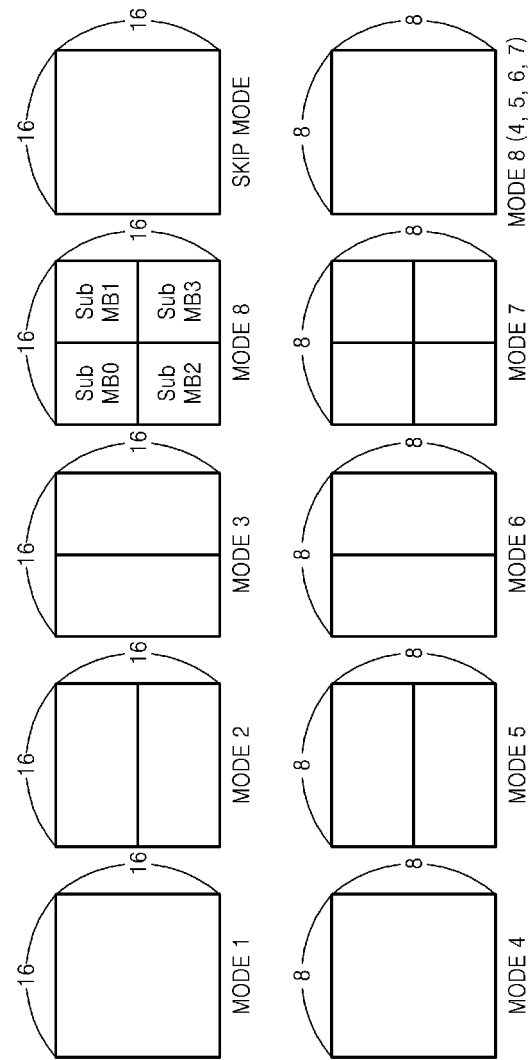
FIG. 2 is a view for explaining a prediction mode of a macroblock in a P-frame in H.264/AVC.

The motion prediction unit 308 divides a macroblock of a currently input frame into blocks of a predetermined size and performs motion prediction on the divided blocks to generate motion vectors. As described with reference to FIG. 1, a macroblock in a P-frame is divided into blocks of a predetermined size according to a prediction mode of 16×16, 16×8, 8×16, 8×8, 8×4, 4×8, or 4×4 prediction mode, and motion vectors of the blocks are predicted.

The motion compensation unit 309 performs motion compensation by using the motion vectors generated by the motion prediction unit 308 and generates prediction blocks.

The subtractor 301 calculates differences between original pixel values of the encoded current macroblock and pixel values of a prediction block generated by the motion compensation unit 309 to generate residual data. The frequency converter 302 applies a discrete cosine transform to the residual data to convert values in a spatial domain into values in a frequency domain.

The quantizer 303 quantizes the values in the frequency domain received from the frequency converter 302, and the entropy encoder 304 performs entropy encoding on the quantized values in the frequency domain and on information on the prediction mode of the current macroblock to generate an encoded bitstream.

The inverse quantizer 305 performs inverse quantization on the values in the frequency domain, and the frequency inverter 306 converts the received inverse-quantized values in the frequency domain into values in the spatial domain.

The adder 306a adds video data received from the motion compensation unit 309 to video data output from the frequency inverter 306 to generate reference video data. The generated reference video data is stored in the frame buffer 307.

Costs of each prediction mode are compared with each other by performing rate-distortion optimization on the bitstream generated by encoding the macroblock according to the prediction modes that can be used for macroblocks in the P-frame, that is, 16×16, 16×8, 8×16, 8×8, 8×4, 4×8, and 4×4 prediction modes and a skip mode, so that final prediction modes of the macroblocks in the P-frame can be determined.

The motion vector prediction unit 310 divides a skip macroblock determined as a skip mode into skip sub-blocks, and generates predictive motion vectors of the skip sub-blocks by using motion vectors of blocks adjacent to the skip sub-blocks. The adjacent blocks used to generate the predictive motion vectors mean adjacent blocks that are encoded and restored before the current skip macroblock is encoded.

Hereinafter, with reference to FIGS. 4A to 4D, a method of dividing a current macroblock E 400 which is determined as the skip macroblock into skip sub-blocks 401, 402, 403, and 404 and generating predictive motion vectors of the skip sub-blocks 401, 402, 403, and 404, according to an exemplary embodiment of the present invention, will be described.

The motion vector prediction unit 310 divides the current macroblock E 400 determined as the skip macroblock into the skip sub-blocks 401 to 404 each having a size of 8×8. The size of the skip sub-blocks 401 to 404 is not limited to 8×8 shown in FIG. 4A and may be 4×4. The motion vector prediction unit 310 generates the predictive motion vectors of the skip sub-blocks 401 to 404 by using motion vectors of blocks adjacent to the skip sub-blocks 401 to 404. A method of generating the predictive motion vectors may correspond to a method of generating predictive motion vectors according to the H.264 standard. Hereinafter, it is assumed that the divided skip sub-blocks 401 to 404 are processed in a scan order of from left to right and from top to bottom.

Figure 4A:
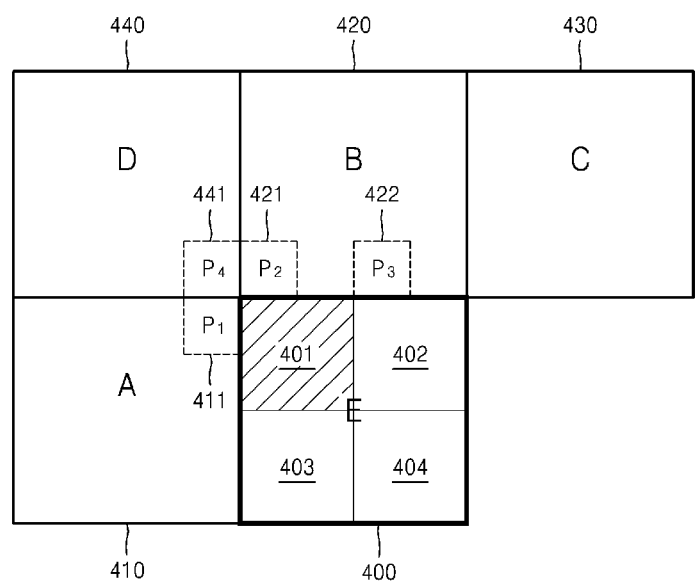
FIGS. 4A to 4D are views for explaining a method of generating predictive motion vectors of skip sub-blocks obtained by dividing a skip macroblock, according to an exemplary embodiment of the present invention.

FIG. 4A is a view for explaining a method of generating predictive motion vectors of the first skip sub-block 401 according to an exemplary embodiment of the present invention. Referring to FIG. 4A, the predictive motion vector of the first skip sub-block 401 may be predicted by using motion vectors of a left adjacent block P1 411, an upper adjacent block P2 421, an upper right adjacent block P3 422, and an upper left adjacent block P4 441 that are encoded and restored before the first skip sub-block 401 is encoded. The left adjacent block P1 411, the upper adjacent block P2 421, the upper right adjacent block P3 422, and the upper left adjacent block P4 441 indicated by dotted lines may represent partitions of blocks adjacent to an upper left corner of the first skip sub-block 401 and a partition of a block adjacent to an upper right corner of the first skip sub-block 401.

When it is assumed that motion vectors of the left adjacent block P1 411, the upper adjacent block P2 421, the upper right adjacent block P3 422, and the upper left adjacent block P4 441 are denoted by MV_P1, MV_P2, MV_P3, and MV_P4, respectively, a predictive motion vector PMV1 of the first skip sub-block 401 may be calculated by substituting the motion vectors of the adjacent blocks of the first skip sub-block 401 into a predetermined function. For example, the predictive motion vector PMV1 of the first skip sub-block 401 may have a median value of the motion vectors of the adjacent blocks, or may be calculated by multiplying the motion vectors of the adjacent blocks by predetermined weights $\alpha$, $\beta$, $\gamma$, and $\delta$, respectively and adding the multiplied values, for example, by using the following equation: PMV1=$\alpha$*MV_P1+$\beta$*MV_P2+$\gamma$*MV-P3+$\delta$*MV_P4. When the predictive motion vector PMV1 has the median value of the motion vectors MV_P1, MV_P2, MV_P3, and MV_P4 of the adjacent blocks, the median value always uses the motion vectors MV_P1 and MV_P2 of the left adjacent block P1 411 and the upper adjacent block P2 421 that are directly adjacent to the first skip sub-block 401 and selects one from among the motion vectors MV_P3 and MV_P4 of the upper right adjacent block P3 422 and the upper left adjacent block P4 441 so that the median value is calculated by using three vectors of three adjacent blocks, or an average value of the motion vectors MV_P3 and MV_P4 of the upper right adjacent block P3 422 and the upper left adjacent block P4 441 is calculated such that the median value can be calculated by using three motion vectors, that is, MV_P1, MV_P2, and (MV_P3+MV_P4)/2.

Figure 4B:
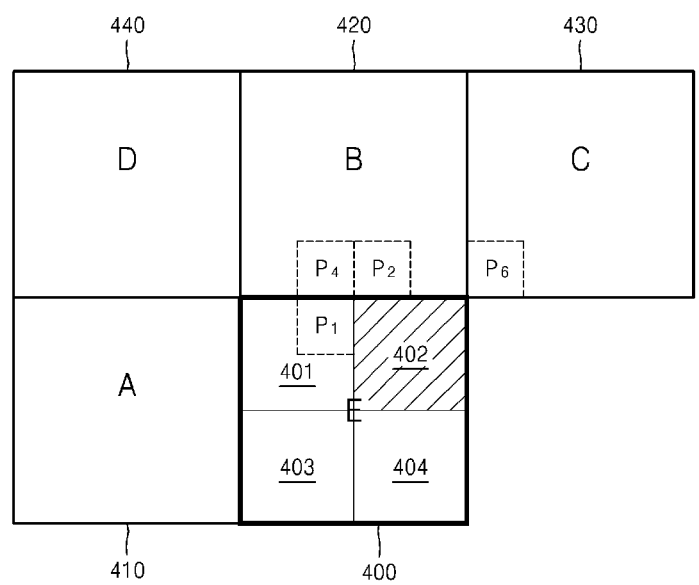
Figure 4C:
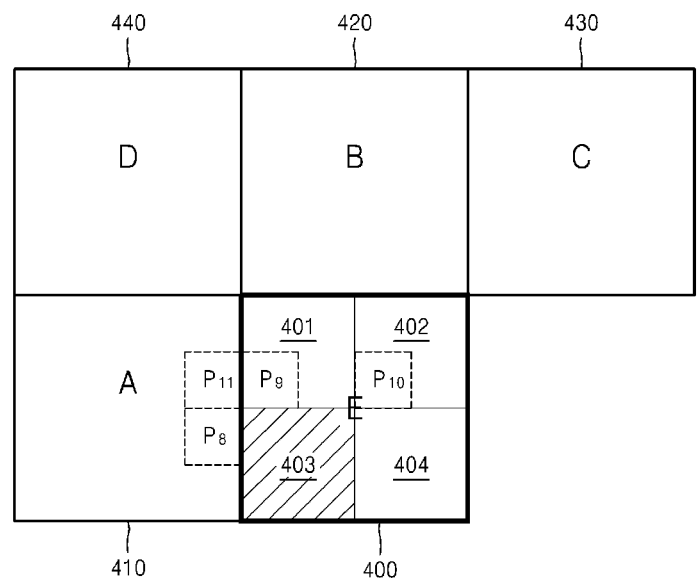
Figure 4D:
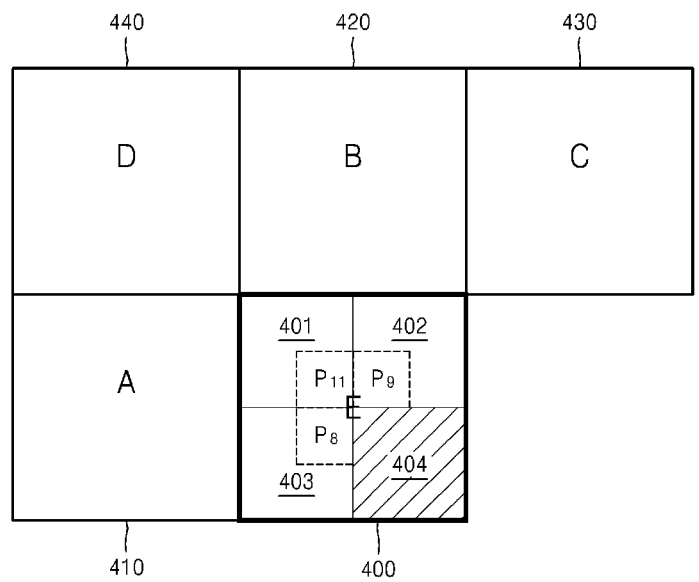

FIGS. 4B to 4D are views for explaining methods of generating predictive motion vectors PMV2, PMV3, and PMV4 of the second, third, and fourth skip sub-blocks 402, 403, and 404, respectively, according to an exemplary embodiment of the present invention. Similarly to the aforementioned method of generating the predictive motion vector PMV1 of the first skip sub-block 401, the predictive motion vector PMV2 of the second skip sub-block 402 may be predicted by calculating a median value or added values of motion vectors of the adjacent blocks P1, P2, P4, and P6. The predictive motion vector PMV3 of the third skip sub-block 403 may be predicted by calculating a medial value or added values of motion vectors of adjacent blocks P8, P9, P10, and P11. Here, since an upper right adjacent block of the fourth skip sub-block 404 is encoded after the current macroblock E 400, the predictive motion vector PMV4 of the fourth skip sub-block 404 is predicted by using motion vectors of only the left adjacent block P8, the upper adjacent block P9, and the upper left adjacent block P11.

As described above, after skip macroblocks are divided into skip sub-blocks and a predictive motion vector of each of the skip sub-blocks is generated, the entropy encoder 304 stores a predetermined flag indicating that the current macroblock is the skip macroblock along with predetermined binary information indicating whether the skip macroblock is divided in a predetermined region of the bitstream. Specifically, the entropy encoder 304 allocates 0 to the flag when the skip macroblock is not divided and transmits only the prediction mode information, and allocates 1 when the skip macroblock is divided so as to enable the decoding apparatus to determine whether the skip macroblock is divided. The video encoding apparatus 300 may perform dividing on all skip macroblocks or determine whether to divide the skip macroblock by comparing costs when the skip macroblock is not divided and encoded with costs when the skip macroblock is divided.

Figure 5:
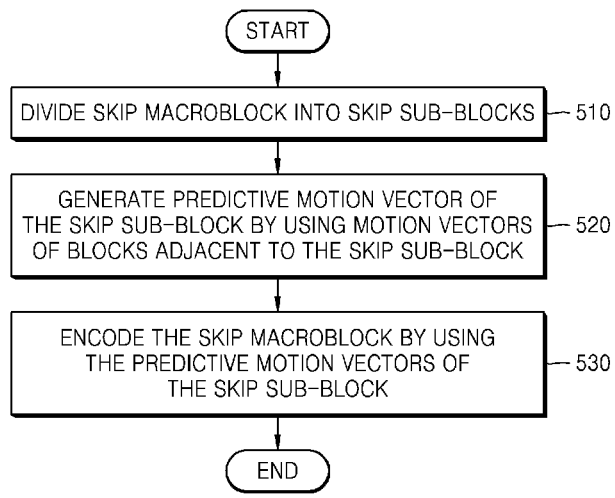
FIG. 5 is a flowchart illustrating a video encoding method according to an exemplary embodiment of the present invention.

FIG. 5 is a flowchart illustrating a video encoding method according to an exemplary embodiment of the present invention.

In operation 510, when prediction modes for macroblocks are determined, a skip macroblock is divided into skip sub-blocks.

In operation 520, predictive motion vectors of the skip sub-blocks are generated by using motion vectors of blocks adjacent to the skip sub-blocks. As described above, a median value or added values of the motion vectors of the adjacent blocks may be calculated to generate the predictive motion vectors of the skip sub-blocks.

In operation 530, when the skip macroblock is encoded by using the predictive motion vectors of the skip sub-blocks, prediction mode information on the skip macroblock including the skip sub-blocks, that is, a predetermined flag which indicates that the current macroblock is the skip macroblock and predetermined binary information which indicates whether the skip macroblock is divided, is inserted into a bitstream, thereby encoding the skip macroblock.

Figure 6:
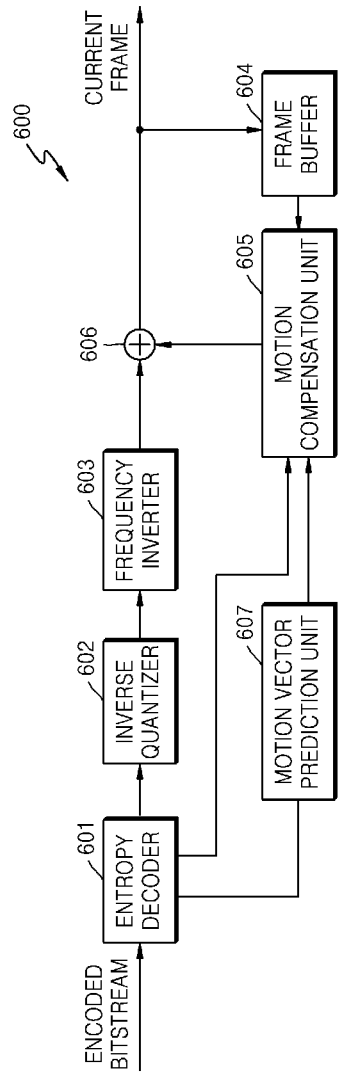
FIG. 6 is a block diagram illustrating a structure of a video decoding apparatus according to an exemplary embodiment of the present invention.

FIG. 6 is a block diagram illustrating a structure of a video decoding apparatus 600 according to an exemplary embodiment of the present invention.

Referring to FIG. 6, the video decoding apparatus 600 according to the current exemplary embodiment of the present invention includes an entropy decoder 601, an inverse quantizer 602, a frequency inverter 603, a frame buffer 604, a motion compensation unit 605, an adder 606, and a motion vector prediction unit 607.

The entropy decoder 601 performs entropy decoding on an encoded bitstream and transmits the entropy-decoded bitstream to the inverse quantizer 602 and the motion vector prediction unit 607. In particular, in inter-mode coding, the entropy decoder 601 extracts prediction mode information and entropy-decoded video data of a current block and outputs the extracted video data to the inverse quantizer 602 and the extracted mode information to the motion vector prediction unit 607.

The inverse quantizer 602 performs inverse quantization on the video data entropy-decoded by the entropy decoder 601 and outputs the inverse-quantized video data to the frequency inverter 603.

The frequency inverter 603 converts the inverse-quantized video data received from the inverse quantizer 602 into values in a spatial domain and outputs the converted values in the spatial domain to the adder 606.

The adder 606 adds the inverse-quantized video data received from the frequency inverter 603 to motion-compensated video data received from the motion compensation unit 605 to generate restored video data. However, the operation of adding the received inverse-quantized video data to the motion-compensated video data is performed on prediction modes excluding a skip mode, and in the skip mode, motion-compensated data itself without additional residual data corresponds to the restored video data. The frame buffer 604 stores the video data output from the adder 606.

The motion vector prediction unit 607 predicts a motion vector of a current block on the basis of prediction mode information extracted by the entropy decoder 601. The estimated motion vectors are output to the motion compensation unit 605. In particular, when the decoded current macroblock is a skip macroblock divided into skip sub-blocks and encoded, the motion vector prediction unit 607 divides the current macroblock into the skip sub-blocks and generates predictive motion vectors of the skip sub-blocks by using motion vectors of blocks adjacent to the skip sub-blocks. Whether the current macroblock is the skip macroblock can be determined by reading flag information indicating whether the current macroblock is the skip macroblock from the prediction mode information included in the bitstream, and whether to divide the skip macroblock into skip sub-blocks can be determined by using binary information indicating whether the skip block is divided, which is transmitted along with the flag information. When the video encoding apparatus 300 and the video decoding apparatus 600 are set to divide all skip macroblocks into skip sub-blocks in advance, the binary information indicating whether the skip block is divided is not needed, and the skip macroblock is divided into skip sub-blocks. The motion vector prediction unit 607 performs the same operations as the motion vector prediction unit 310 of the video encoding apparatus 300 illustrated in FIG. 3 to divide the current skip macroblock into skip sub-blocks and generate a predictive motion vector of each of the skip sub-blocks by using adjacent blocks.

The motion compensation unit 605 restores video data of each of the skip sub-blocks by using prediction values generated by performing motion compensation using the predictive motion vectors of the skip sub-blocks. As described above, for the skip sub-blocks, the operation of adding residual data to the motion-compensated prediction values is omitted.

Figure 7:
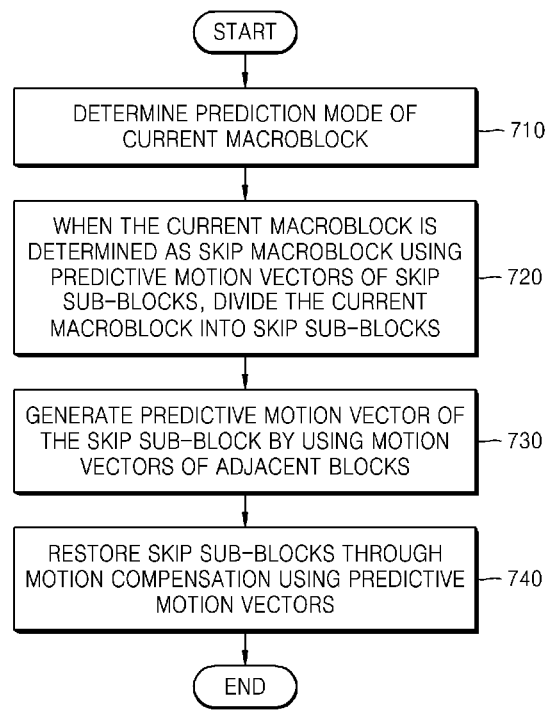
FIG. 7 is a flowchart illustrating a video decoding method according to an exemplary embodiment of the present invention.

FIG. 7 is a flowchart illustrating a video decoding method according to an exemplary embodiment of the present invention.

Referring to FIG. 7, in operation 710, a prediction mode of a decoded current macroblock included in a received bitstream is determined.

In operation 720, when the current macroblock is a skip macroblock which is divided into skip sub-blocks and encoded by using predictive motion vectors of the divided skip sub-blocks as motion vector information, the current macroblock is divided into skip sub-blocks.

In operation 730, predictive motion vectors of the skip sub-blocks are generated by using motion vectors of blocks adjacent to the skip sub-blocks.

In operation 740, the current macroblock is restored by restoring data of the skip sub-blocks of the current macroblock through motion compensation using the predictive motion vectors of the skip sub-blocks.

Accordingly, a skip mode that is applied to a macroblock having a size of 16×16 in the related art, can be applied to blocks having smaller sizes, so that motion vector prediction of a skip block using pixels of spatially adjacent blocks is possible. Therefore, video prediction efficiency can be improved.

Accordingly, a skip macroblock is divided into smaller skip sub-blocks to perform prediction, so that video prediction efficiency can be improved. In addition, predetermined binary information indicating whether the skip macroblock is divided is transmitted to the decoding apparatus, so that high-quality video data can be provided within a restricted bandwidth.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A video encoding method comprising:
dividing an input frame into macroblocks;
performing motion prediction on the divided macroblocks to generate motion vectors;
determining a skip macroblock among the divided macroblocks by selecting the macroblock of which a motion vector is equal to a predictive motion vector predicted using motion vectors of adjacent blocks;
dividing the determined skip macroblock into skip sub-blocks;
generating predictive motion vectors of the skip sub-blocks by using motion vectors of blocks adjacent to the skip sub-blocks; and
encoding the skip macroblock comprising the skip sub-blocks by using the generated predictive motion vectors of each of the skip sub-blocks,
wherein the skip sub-blocks are each smaller in size than the determined skip macroblock,
wherein the determined skip macroblock is one skip macroblock that is divided into the skip sub-blocks; and
wherein the encoding the skip macroblock comprises inserting information indicating whether the skip macroblock is divided into the skip sub-blocks and the predictive motion vectors of the skip sub-blocks which are used as motion vector information, into a bitstream.

2. The video encoding method of claim 1, wherein the generating the predictive motion vectors of the skip sub-blocks comprises determining a vector generated by substituting motion vectors of blocks adjacent to one of the skip sub-blocks into a function as a predictive motion vector of one of the skip sub-blocks.

3. The video encoding method of claim 1, wherein the generating the predictive motion vectors of the skip sub-blocks comprises determining a median value of motion vectors of blocks adjacent to one of the skip sub-blocks as a predictive motion vector of the one of the skip sub-blocks.

4. The video encoding method of claim 1, wherein the generating the predictive motion vectors of the skip sub-blocks comprises multiplying motion vectors of blocks adjacent to one of the skip sub-blocks by weights, respectively, to generate multiplied values, and adding the multiplied values.

5. The video encoding method of claim 1, wherein the adjacent blocks comprise three or more of an upper adjacent block, a left adjacent block, an upper left adjacent block, and an upper right adjacent block, which are encoded and restored before the skip sub-blocks are encoded.

6. The video encoding method of claim 1, wherein the skip macroblock has a size of 16×16, and the skip sub-blocks have a size of 8×8 or 4×4.

7. A video encoding apparatus comprising:
a motion prediction unit which divides an input frame into macroblocks, performs motion prediction on the divided macroblocks to generate motion vectors, and determines a skip macroblock among the divided macroblocks by selecting the macroblock of which a motion vector is equal to a predictive motion vector predicted using motion vectors of adjacent blocks;
a motion vector prediction unit which divides the determined skip macroblock into skip sub-blocks and generates predictive motion vectors of the skip sub-blocks by using motion vectors of blocks adjacent to each of the skip sub-blocks; and
an encoder which encodes the determined skip macroblock by using the predictive motion vectors of the skip sub-blocks,
wherein the skip sub-blocks are each smaller in size than the determined skip macroblock,
wherein the determined skip macroblock is one skip macroblock that is divided into the skip sub-blocks, and
wherein the encoder inserts information indicating whether the determined skip macroblock is divided into skip sub-blocks and the predictive motion vectors of the skip sub-blocks which are used as motion vector information, into a bitstream.

8. The video encoding apparatus of claim 7, wherein the motion vector prediction unit determines a vector generated by substituting motion vectors of blocks adjacent to one of the skip sub-blocks into a function as a predictive motion vector of one of the skip sub-blocks.

9. The video encoding apparatus of claim 7, wherein the motion vector prediction unit determines a median value of motion vectors of blocks adjacent to the skip sub-blocks as predictive motion vector of one of the skip sub-blocks.

10. The video encoding apparatus of claim 7, wherein the motion vector prediction unit generates the predictive motion vectors by multiplying motion vectors of blocks adjacent to each of the skip sub-blocks by weights, respectively, to generate multiplied values, and adding the multiplied values.

11. The video encoding apparatus of claim 7, wherein the adjacent blocks comprise three or more of an upper adjacent block, a left adjacent block, an upper left adjacent block, and an upper right adjacent block, which are encoded and restored before the skip sub-blocks are encoded.

12. The video encoding apparatus of claim 7, wherein the determined skip macroblock has a size of 16×16, and the skip sub-blocks have a size of 8×8 or 4×4.

13. A video decoding method comprising:
determining a prediction mode of a current macroblock and when the prediction mode of the current macroblock is skip mode, determining whether to divide the current macroblock into skip sub-blocks based on information indicating whether the skip macroblock is divided into the skip sub-blocks;
dividing the current macroblock into the skip sub-blocks if a result of the determining of whether to divide the current macroblock shows that the current macroblock is the skip macroblock divided into the skip sub-blocks and encoded by using predictive motion vectors of the divided skip sub-blocks as motion vector information;
generating the predictive motion vectors of the skip sub-blocks by using motion vectors of blocks adjacent to each of the skip sub-blocks; and
restoring the current macroblock by restoring data of the skip sub-blocks included in the current macroblock through motion compensation using the predictive motion vectors of the skip sub-blocks,
wherein a macroblock is encoded as the skip macroblock when a motion predicted motion vector of the macroblock is equal to a predictive motion vector predicted using motion vectors of adjacent blocks, and
wherein the skip sub-blocks are each smaller in size than the skip macroblock, and
wherein the skip macroblock is one skip macroblock that is divided into the skip sub-blocks.

14. The video decoding method of claim 13, wherein the generating the predictive motion vectors of the skip sub-blocks comprises determining a vector generated by substituting motion vectors of blocks adjacent to one of the skip sub-blocks into a predetermined function as the predictive motion vector of one of the skip sub-blocks.

15. The video decoding method of claim 13, wherein the generating the predictive motion vectors of the skip sub-blocks comprises determining a median value of motion vectors of blocks adjacent to one of the skip sub-blocks as the predictive motion vector of the one of the skip sub-blocks.

16. The video decoding method of claim 13, wherein the generating the predictive motion vectors of the skip sub-blocks comprises multiplying motion vectors of blocks adjacent to one of the skip sub-blocks by weights, respectively, to generate multiplied values, and adding the multiplied values.

17. A video decoding apparatus comprising:
a prediction mode determiner which determines a prediction mode of a current macroblock and when the prediction mode of the current macroblock is skip mode, determines whether to divide the current macroblock into skip sub-blocks based on information indicating whether the skip macroblock is divided into the skip sub-blocks that is included in a received bitstream;
a motion vector prediction unit, which, if a result of the determining shows that the current macroblock is a skip macroblock divided into skip sub-blocks and encoded by using predictive motion vectors of the divided skip sub-blocks as motion vector information, divides the current macroblock into the skip sub-blocks and generates the predictive motion vectors of the skip sub-blocks by using motion vectors of blocks adjacent to each of the skip sub-blocks; and
a motion compensation unit which restores the current macroblock by restoring data of the skip sub-blocks included in the current macroblock through motion compensation using the predictive motion vectors of the skip sub-blocks,
wherein a macroblock is encoded as the skip macroblock when a motion predicted motion vector of the macroblock is equal to a predictive motion vector predicted using motion vectors of adjacent blocks, and
wherein the skip sub-blocks are each smaller in size than the skip macroblock, and
wherein the skip macroblock is one skip macroblock that is divided into the skip sub-blocks.

18. The video decoding apparatus of claim 17, wherein the motion vector prediction unit determines a vector generated by substituting each of motion vectors of blocks adjacent to one of the skip sub-blocks into a function as a predictive motion vector of one of the skip sub-blocks.

19. The video decoding apparatus of claim 17, wherein the motion vector prediction unit determines a median value of motion vectors of blocks adjacent to one of the skip sub-blocks as a predictive motion vector of the one of the skip sub-blocks.

20. The video decoding apparatus of claim 17, wherein the motion vector prediction unit generates the predictive motion vector by multiplying motion vectors of blocks adjacent to one of the skip sub-blocks by weights, respectively, to generate multiplied values, and adding the multiplied values.

\* \* \* \* \*